(12) United States Patent
Loley

(10) Patent No.: US 9,649,237 B2
(45) Date of Patent: May 16, 2017

(54) ELECTRIC MOTOR FURNITURE DRIVE

(75) Inventor: Steffen Loley, Osnabruck (DE)

(73) Assignee: DEWERTOKIN GMBH, Kirchlengern (DE)

( * ) Notice: Subject to any disclaimer, the term of this patent is extended or adjusted under 35 U.S.C. 154(b) by 0 days.

(21) Appl. No.: 13/885,874

(22) PCT Filed: Nov. 15, 2011

(86) PCT No.: PCT/EP2011/070136
§ 371 (c)(1),
(2), (4) Date: Jul. 26, 2013

(87) PCT Pub. No.: WO2012/065984
PCT Pub. Date: May 24, 2014

(65) Prior Publication Data
US 2013/0300233 A1    Nov. 14, 2013

(30) Foreign Application Priority Data
Nov. 16, 2010 (DE) .................... 20 2010 012 910 U

(51) Int. Cl.
| A61G 7/018 | (2006.01) |
| G05B 11/01 | (2006.01) |
| A47C 20/04 | (2006.01) |
| A47C 31/00 | (2006.01) |
| G08C 17/02 | (2006.01) |

(Continued)

(52) U.S. Cl.
CPC ............ *A61G 7/018* (2013.01); *A47C 20/041* (2013.01); *A47C 31/008* (2013.01); *G08C 17/02* (2013.01); *G08C 19/00* (2013.01); *G08C 23/04* (2013.01); *H02K 99/20* (2016.11);

(Continued)

(58) Field of Classification Search
CPC ...... A61G 7/018; A61G 7/05; A61G 2203/12; A61G 2203/20; A61G 13/02; A61B 6/0457; A61B 6/0407; A61B 5/6891; A61B 5/7475; A47C 20/041; A47C 31/008; A47C 21/003
USPC .......... 5/600, 607, 610, 612, 616; 700/1, 17, 700/21; 310/71
See application file for complete search history.

(56) References Cited

U.S. PATENT DOCUMENTS 5,903,211 A * 5/1999 Flego et al. ............. 340/286.07
6,108,838 A * 8/2000 Connolly et al. ................. 5/609
(Continued)

FOREIGN PATENT DOCUMENTS

| CN | 101305434 A | 11/2008 |
| DE | 297 22 179 | 5/1998 |

(Continued)

OTHER PUBLICATIONS

Chinese Office Action dated Nov. 27, 2014, for Chinese Patent Application No. 201180063257.6.
(Continued)

*Primary Examiner* — Mohammad Ali
*Assistant Examiner* — Sheela S Rao
(74) *Attorney, Agent, or Firm* — Karceski IP Law, PLLC

(57) ABSTRACT

An electric motor furniture drive for a piece of furniture having at least one furniture part. The electric motor furniture drive includes a control unit, at least one adjustment drive, and at least one operating unit configured as a multifunction operating part connected via an adapter device to the control unit.

16 Claims, 2 Drawing Sheets

(51) Int. Cl.
G08C 19/00 (2006.01)
G08C 23/04 (2006.01)
H04M 1/725 (2006.01)
H02K 99/00 (2014.01)
H04M 1/04 (2006.01)

(52) U.S. Cl.
CPC .... H04M 1/72527 (2013.01); G08C 2201/50 (2013.01); G08C 2201/93 (2013.01); H04M 1/04 (2013.01)

(56) References Cited

U.S. PATENT DOCUMENTS

| | | | |
|---|---|---|---|
| 6,351,678 | B1 | 2/2002 | Borders |
| 2002/0138905 | A1* | 10/2002 | Bartlett et al. ................ 5/607 |
| 2006/0058587 | A1* | 3/2006 | Heimbrock .......... A61B 6/0457 600/300 |
| 2008/0092292 | A1* | 4/2008 | Rawls-Meehan ................ 5/600 |
| 2009/0105985 | A1* | 4/2009 | Steger et al. ................ 702/127 |
| 2010/0231421 | A1* | 9/2010 | Rawls-Meehan .... A47C 20/041 341/20 |

FOREIGN PATENT DOCUMENTS

| | | |
|---|---|---|
| EP | 2 374 439 | 10/2011 |
| JP | H0595978 | 4/1993 |
| JP | 2001057994 A | 3/2001 |

OTHER PUBLICATIONS

European Search Report dated Feb. 19, 2016, for European Patent Application No. 15201970.

Japanese Office Action dated Oct. 31, 2016, for Japanese Patent Application No. 2013-539228.

\* cited by examiner

ELECTRIC MOTOR FURNITURE DRIVE

CROSS-REFERENCE TO RELATED APPLICATION

This application is a national stage of International Application PCT/EP2011/070136, filed Nov. 15, 2011, and claims benefit of and priority to German Patent Application No. 20 2010 012 910.9, filed Nov. 16, 2010, the content of which Applications are incorporated by reference herein.

The present disclosure relates to an electric motor furniture drive for a piece of furniture. The piece of furniture includes one or more adjustable furniture components, for example, a healthcare or hospital bed. The electric motor furniture drive includes a control unit, at least one adjustment drive, and at least one operating unit.

An electric motor furniture drive is known in many embodiments. An embodiment according to the present disclosure is directed to the type of the furniture to be adjusted, for example, a slatted frame, a hospital or healthcare bed, or seating and reclining furniture, or for height adjustment of a tabletop. The furniture drive can be embodied as a single drive, double drive, and/or multiple drive. In the case of single drives, a drive unit is coupled to the drive gear motor, while in the case of a double drive having one gear motor or having two gear motors, coupled drive units are provided, which are arranged in a shared housing.

DE 297 22 179 U1 describes a furniture drive having at least one electromechanical drive train and a control unit, which can be activated to trigger the functions by an operating element.

Multimedia devices, for example, smart phones, which are continuously being equipped with additional functions in the course of progressing development as multifunction control panels.

Embodiments of the present disclosure are directed to improving an electric motor furniture drive for interaction with multimedia devices.

Embodiments of the present disclosure include that the at least one operating unit of the electric motor furniture drive is configured as a multifunction operating unit and is connected via an adapter device to the control unit.

A multifunction operating part is understood in the embodiments of the present disclosure as including the following devices: mobile telephone, handheld device, laptop, device having Bluetooth function, normal telephone, smart phone, personal digital assistant (PDA), electronic organizer, for example.

These operating parts are used to operate a piece of furniture to be adjusted, for example, a slatted frame, a hospital or healthcare bed, or seating and reclining furniture, or for height adjustment of a tabletop.

In an embodiment of the present disclosure, the electric motor furniture drive can, for example, have a bus unit, wherein the bus unit is connected between the adapter device and the control unit. Therefore, further possible uses are provided, in accordance with the present disclosure.

For the connection of the at least one operating unit, the adapter device can, for example, have an interface and at least one converter unit. The at least one converter unit of the adapter device can, for example, be implemented, or configured, to convert control signals of the operating unit into control signals of the control unit.

In an embodiment of the present disclosure, the adapter device can, for example, be implemented, or configured, for adapting and relaying feedback signals of the control unit to the operating unit.

The control unit can, for example, have at least one feedback signal generator for generating feedback signals for this purpose.

Furthermore, in accordance with embodiments of the present disclosure, it is provided that the operating unit can be implemented, or configured, for receiving the feedback signals of the control unit, which are adapted and relayed by the adapter device. This can be embodied in software, for example, in accordance with the present disclosure.

In addition, in an embodiment of the present disclosure, the operating unit can be implemented, or configured, for displaying the feedback signals of the control unit, which are adapted and relayed by the adapter device, in suitable form using a display section. In other words, specific symbols and/or logos can be displayed in order to display the actuated functions so they are generally understandable for an operator.

The feedback signals can, for example, in accordance with the present disclosure, also be used for the plausibility check of control signals of the operating unit. That is, a control signal generated by an actuation in the control unit triggers a switching command for a switch component, for example, a relay and/or semiconductor switch. If a correct function then occurs, this is fed back. If a control signal is generated or changed by interference, for example, the interfered control signal is recognized as not usable because of the feedback signal which is not formed. A corresponding display is possible, for example, in accordance with the present disclosure.

The electric motor furniture drive has a processor unit, which can be implemented, or configured, to recognize actuating errors of the operating unit. This means that, for example, due to simultaneous actuation of button elements of the operating unit, no control signals are generated, whereby incorrect control and also overload of the adjustment drives and/or the control unit can be prevented, in accordance with the present disclosure.

In the case of a healthcare and/or hospital bed, the electric motor furniture drive can, for example, have a manual control having at least one blocking function operable by authorized personnel, in accordance with the present disclosure. A status of the at least one blocking function can, for example, be displayable by the at least one operating unit, in accordance with the present disclosure.

Embodiments according to the present disclosure are discussed further herein.

Other aspects of the present disclosure will become apparent from the following descriptions when considered in conjunction with the accompanying drawings.

DETAILED DESCRIPTION

Figure 1:
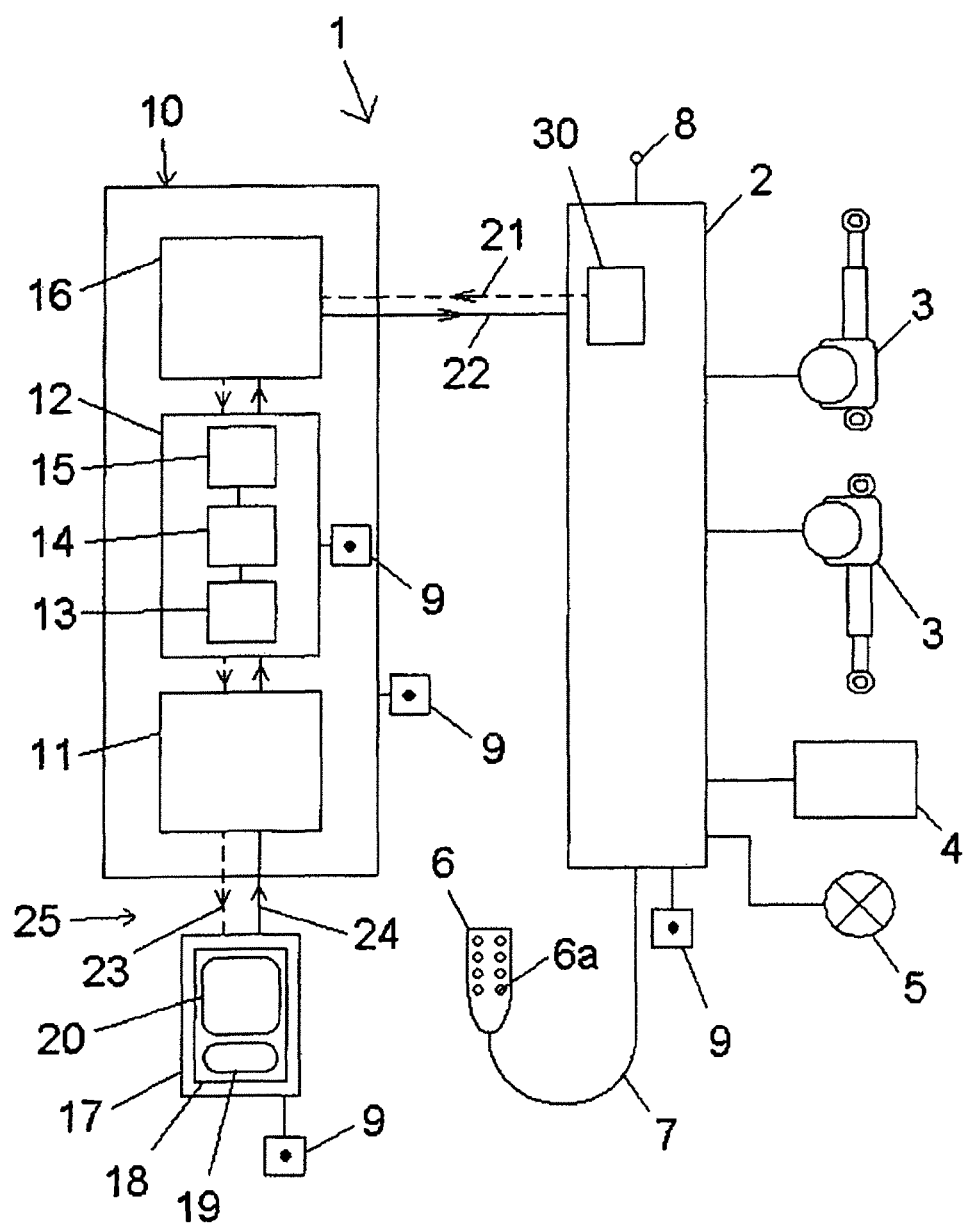
FIG. 1 shows a schematic block diagram of a first exemplary embodiment of a furniture drive, according to the present disclosure.

FIG. 1 shows a schematic block diagram of a first exemplary embodiment of a furniture drive 1, according to the present disclosure.

In this exemplary embodiment, the furniture drive 1 comprises a control unit 2, two adjustment drives 3, a heater 4, a lighting element 5, a manual control 6, an adapter device 10, and an operating unit 17.

The adjustment drives 3 are each used to adjust a furniture part (not shown), for example, a head part and a foot part of a bed, for example, a hospital bed. The heater 4 can be configured, for example, as a heated blanket or heated cushion or can be, for example, integrated in a furniture component, for example, in a mattress or in a seat part or in a back part, respectively. The lighting element 5 may be, for example, a reading lamp or a night light. The control unit 2 is supplied with electrical power via a supply connection 8 from a public or local network and/or from a rechargeable battery. By the manual control 6, the adjustment drives 3 can be operated in such a way that the control unit 2 supplies the adjustment drives 3 with electrical power for adjusting the respective furniture part into a desired position on the basis of control signals generated by operating elements 6a. Electromechanical switches, for example, relays and/or conductor switches, for example, MOSFET, can be used for this purpose. Heater 4 and lighting element 5 can also be turned on and off.

The manual control 6 is implemented, or configured, as a typical manual switch, a manual switch having mechanical blocking lock and/or a blocking box, and is connected via a connection link 7 to the control unit 2. The connection link 7 can be, for example, a wired connection, a radio link, and/or an infrared link. In the example of a hospital bed, only an authorized person can block functions of the control unit 2 for the patient lying in the hospital bed by the blocking lock or similar switch elements. A first-fault safety of the adjustment drives 3, the heater 4, the lighting elements 5 can therefore be provided using the control unit 2, in accordance with embodiments of the present disclosure.

In the first exemplary embodiment, the manual control 6 is only provided for authorized personnel. The operating unit 17 is provided for the patients in its range.

The operating unit 17 is shown, for example, as a multi-function operating part for patient communications of manifold types having a large-area touchscreen 18 having an operating section 19 and a display section 20. However, various devices can also be used, in accordance with the present disclosure, for the operating unit 17, for example, a mobile telephone, handheld device, laptop, device with Bluetooth function, normal telephone, smart phone, personal digital assistant (PDA), electronic organizer. Of course, operating units 17 having individual implementations are also possible, for example, having USB interface and/or other transmission properties. However, it is essential that button/button elements and/or a touchscreen are provided as the operating section 19, in accordance with the present disclosure.

The adapter device 10 is implemented, or configured for the purpose of connecting the above-listed devices, identified as the operating unit 17, in accordance with the present disclosure, to the control unit 2. The possibility is thus provided that these operating units 17 are usable to control the electric motor furniture drive 1, in accordance with the present disclosure.

The adapter device 10 is thus connectable to the respective operating unit 17 via an operating link 25. The operating link 25 can be implemented, or configured, as both wired and also wireless, for example, a routine radio link, Bluetooth, and/or infrared. The operating link 25 has a feedback line 23 and an action line 24.

Furthermore, the control unit 2 is connected via an action link 22 and a feedback link 21 to the adapter device 10. This connection can be implemented, or configured, as a permanent and/or plug-in wired connection and/or as wireless. The operating unit 17 can, for example, communicate via the adapter device 10 with the control unit 2, in order to operate the adjustment drives 3, the heater 4, and the lighting element 5. That is, turn them on and off and adjust them, respectively.

The structure of the adapter device 10 is discussed further in relation to the embodiments of the present disclosure.

The adapter device 10 comprises an interface 11, a converter unit 12, and a level adapter 16. The operating unit 17 is provided with an operating system, for example, Linux and is connected via a USB connection as the operating link 25 to the interface 11 of the adapter device 10. The interface 11 is used to adapt the USB connection of the operating unit 17 and is connected to the converter unit 12, which has three converters 13, 14, 15, which execute a translation of the control commands of the operating unit 17 between the USB connection and the control unit 2. The converter unit 12, for example, has a controller, a memory, and at least one translation program. The first converter 13 executes a conversion from USB to RS232 and the second converter 14 is used for a further conversion from RS232 to RS485. The third converter 15 is responsible for a further conversion, which can, for example, have an amplifier function, among other things, for example. Finally, a level adapter 16 can, for example, be provided, and which is arranged between the converter unit 12 and the control unit 2 and performs an adaptation to the control unit 2.

To operate one of the adjustment drives 3, or the heater 4 or the lighting element 5, a button element arranged on the operating section 19 is pressed. A corresponding control signal is then generated by the control program of the operating unit 17 and fed via the operating link 25 by the action line 24 to the adapter device 10. The adapter device 10 carries out appropriate adaptations and processing and/or execution of this control signal in such a manner that it switches on the associated switch element, for example, a relay, via the action link 22 in adapted form and with appropriate level in the control unit 2, whereby the adjustment drive 3 moves in the desired direction. When the actuated button element of the operating section 19 of the operating unit 17 is released, the adjustment drive 3 is turned off again.

The communication via the operating link 25 and/or the adapter device 10 and/or the control unit 2 is formed by serial data signals or by logical data signals and/or logical switching signals. These data signals are conducted via wire as electrical data signals. In the case of wireless transmission links, they are transmitted as electromagnetic radio signals or light signals.

The control unit 2 additionally has a feedback signal generator 30. The feedback signal generator 30 first generates a feedback signal for the respective actuated function and transmits this feedback signal via the feedback link 21 to the adapter device 10. The feedback signal is converted therein, as described above, in the reverse manner and fed via the feedback line 23 to the operating unit 17. The operating unit 17 can then display appropriate feedback on the display section 20, specifically that the actuated function is carried out. The operating unit 17 can carry out a plausibility check based on the feedback, as discussed hereafter. An ending of the actuated function is also fed back.

Furthermore, a feedback signal is generated by the feedback signal generator 30 when the respective adjustment drive 3 has reached an end position and therefore can no longer execute adjustment in the desired direction. The temperature of the heater 4, the adjustment position of each adjustment drive 3, the intensity of a massage unit (not shown), switching states and intensities of the lighting element 5, for example, can also be displayed. The feedback signal generator 30 can also generate associated feedback signals for error messages of the control unit 2, which can be displayed on the display section 20 of the operating unit 17 using suitable signals. An adjustment drive 3 without function, in accordance with the present disclosure, can thus be displayed. It is also possible, within the scope of the present disclosure, that a cause for the fault is displayed, for example, a non-switching relay or an overload in the event of excess temperature.

Blocked functions can also be displayed to the operator correspondingly on the operating unit 17, so that unnecessary actuations and therefore additional wear by pressing strongly on button elements which are apparently not functioning can be omitted, for example.

A function, for example, using software, may, for example, make it possible to recognize errors in the event of the operation of button elements of the operating section 19, for example, a plurality of simultaneously pressed button elements, can be integrated in the operating unit 17 or the adapter device 10 or the control unit 2. A command feedback can be performed to the transmitter, that is, to the operating unit 17, in order to check the transmitted control signal for plausibility. Renewed transmission with additional or other release code or switching of a line to a specific potential can be possible and executed, in accordance with the present disclosure.

Figure 2:
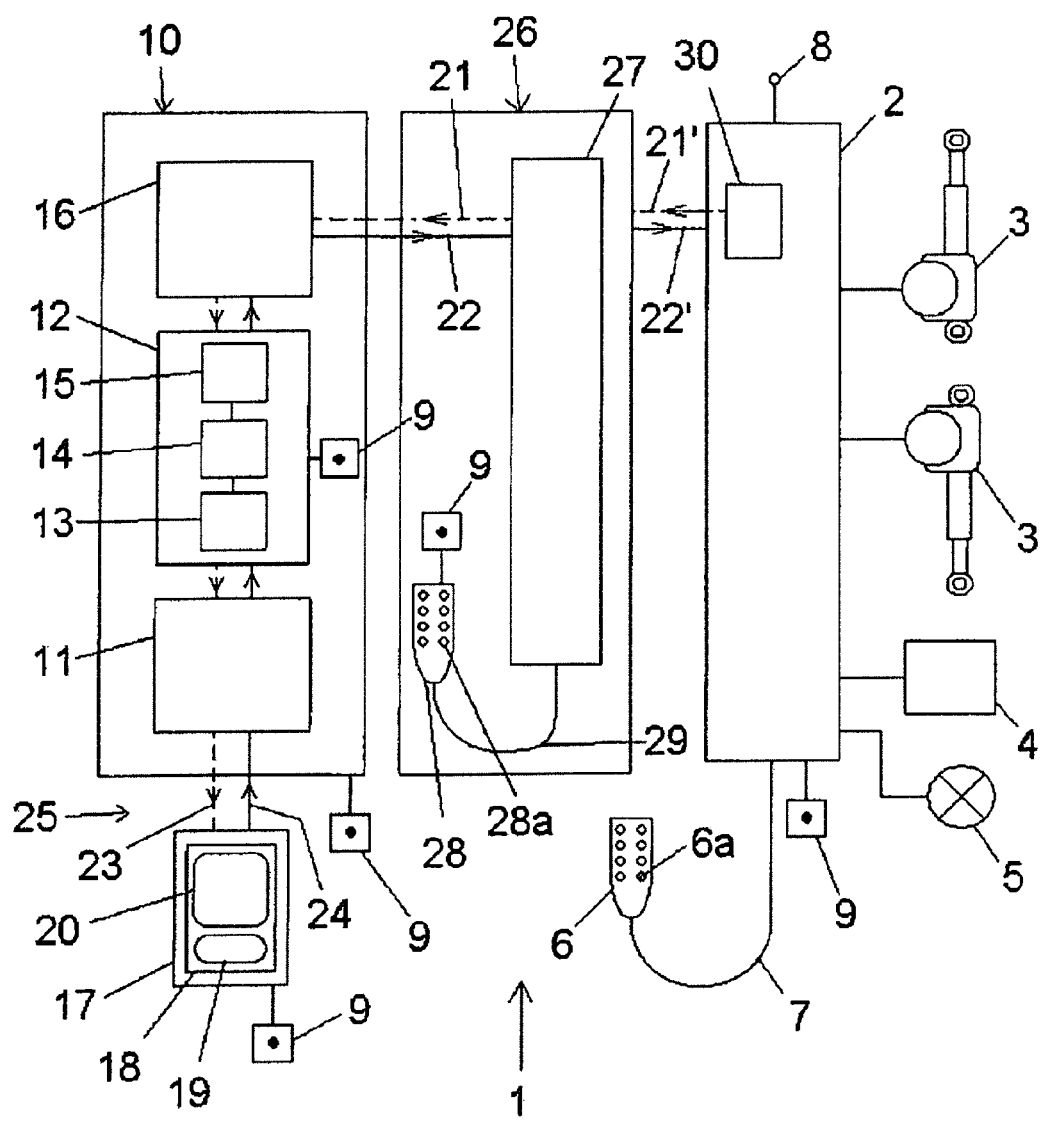
FIG. 2 shows a schematic block diagram of a second exemplary embodiment of a furniture drive, according to the present disclosure.

A processor unit 9, or processor units 9, which can, for example, also be designated as a higher-order intelligence and has a control program for the electric motor furniture drive 1, can be arranged at different positions of the electric motor furniture drive 1, as shown in FIGS. 1 and 2. The processor units 9 can thus be situated in or on the control unit 2 in at least one of the embodiments, for example. The processor unit 9 can also be part of the adapter device 10, for example, in or on the converter unit 12. An arrangement of on or in the operating unit 17 is within the scope of the present disclosure.

FIG. 2 shows a schematic block diagram of a second exemplary embodiment of the furniture drive 1, according to the present disclosure.

A difference from the first exemplary embodiment is that the electric motor furniture drive 1 is equipped with a bus system having a bus unit 26. The bus unit 26 has, for example, a bus interface 27 and is connected between the adapter device 10 and the control unit 9. The bus unit 26 and the control unit 9 are connected via a feedback link 21' and an action link 22'. The bus interface 27 is coupled to a bus manual switch 28 having bus manual switch elements 28a. The bus manual switch 28 can have the processor unit 9, for example.

The adapter device 10 is implemented, or configured, in this second exemplary embodiment, so that it performs an adaptation between operating unit 17 and the bus interface 27 in a suitable manner, wherein corresponding conversions and level adaptations are possible within the scope of the present disclosure.

The region of the control unit 2 having the attached adjustment drives 3 and heater 4, lighting element 5, a massage unit (not shown, a night light (not shown)) is configured as a first-fault safe.

In both exemplary embodiments of the present disclosure, the adapter device 10 with the respective attached or coupled operating unit 17 can, for example, have a type of error detection, as described above, or a type of error rejection method.

The exemplary embodiments of the present disclosure are reflected in the appended claims.

It is within the scope of the present disclosure, for example, that character/symbol blocks are also displayed on the display section 20 of the operating unit 17 for authorized personnel via corresponding codes, in order to be able to perform releases/blocks of functions of the electric motor furniture drive 1.

Furthermore, it is within the scope of the present disclosure that terminals for patient data, such as pulse, blood pressure, for example, can be provided, which can be retrieved for the patients or for authorized personnel on the operating unit 17.

Of course, the operating unit 17 can, within the scope of the present disclosure, also be provided and/or coupled with multimedia functions, for example, telephone, television, radio, Internet.

Although the present disclosure has been described and illustrated in detail, it is to be clearly understood that this is done by way of illustration and example only and is not to be taken by way of limitation. The scope of the present disclosure is to be limited only by the terms of the appended claims.

I claim:

1. An electric motor drive for a bed having at least one bed part, the electric motor drive comprising:
   a control unit;
   at least one adjustment drive operatively connected to the control unit to adjust the at least one bed part into at least one position in response to at least one command from the control unit;
   at least one operating unit operatively connected to the control unit, wherein the at least one operating unit is one selected from a group comprising a mobile telephone, a handheld device, a laptop, a device with Bluetooth function, a normal telephone, a smart phone, a personal data assistant, and an electronic organizer, wherein the at least one operating unit issues at least one control signal, wherein the at least one operating unit comprises a multifunction operating part having an operating section and a display section and wherein the at least one operating unit is controllable by a person within a predetermined range of the bed; and
   an adapter device connected between the at least one operating unit and the control unit, wherein the adapter device receives the at least one control signal from the at least one operating unit, adapts the at least one control signal, and forwards at least one adapted control signal to the control unit,
   wherein the adapter device comprises at least one converter unit configured to receive the at least one control signal and convert the at least one control signal into at least one converted control signal,
   wherein the adapter device comprises an interface to connect the at least one operating unit to the at least one converter unit,
   wherein the adapter device also comprises a level adapter that adapts the at least one control signal before transmission to the control unit to provide leveling control to the at least one adjustment drive,
   wherein the at least one converter unit is disposed operatively between the interface and the level adapter,
   wherein the level adapter is disposed operatively between the at least one converter unit and the control unit,
   wherein the interface is disposed operatively between the at least one operating unit and the at least one converter unit, and wherein the control unit issues the at least one command in response to receipt of the at least one adapted control signal to the at least one adjustment drive.

2. The electric motor drive according to claim 1, wherein the adapter device is configured to adapt and relay feedback signals of the control unit to the at least one operating unit.

3. The electric motor drive according to claim 2, wherein the control unit comprises at least one feedback signal generator that generates the feedback signals.

4. The electric motor drive according to claim 2, wherein the at least one operating unit is configured to receive the feedback signals from the control unit, which feedback signals are adapted and relayed by the adapter device.

5. The electric motor drive according to claim 4, wherein the at least one operating unit is configured to display the feedback signals from the control unit on a display section.

6. The electric motor drive according to claim 2, wherein the feedback signals are used for a plausibility check of the at least one control signal from the at least one operating unit.

7. The electric motor drive according to claim 1, further comprising a processor unit, wherein the processor unit is disposed in association with at least one of the control unit, the adapter device, and the at least one operating unit, wherein the processor unit is configured to recognize actuating errors of the at least one operating unit.

8. The electric motor drive according to claim 1, further comprising a manual control having at least one blocking function operable by authorized personnel, wherein a status of the at least one blocking function is displayed by the at least one operating unit.

9. The electric motor drive according to claim 1, further comprising a bus unit, wherein the bus unit is connected between the adapter device and the control unit.

10. The electric motor drive according to claim 1, wherein the bed is one of a healthcare bed and a hospital bed.

11. The electric motor drive according to claim 1, wherein the at least one operating unit is a smart phone.

12. The electric motor drive according to claim 1, wherein the adapter device comprises a first converter that executes a first conversion of the control signal from a first format to a second format, a second converter that executes a second conversion of second format to a third format, and a third converter that executes a third conversion from the third format to a fourth format.

13. The electric motor drive according to claim 12, wherein the first format is a USB format, the second format is a RS232 format, and the third format is a RS485 format.

14. The electric motor drive according to claim 12, wherein the third converter also amplifies the control signal.

15. The electric motor drive according to claim 1, further comprising:
a manual control connected to the control unit, wherein the manual control also issues at least one control signal, and wherein the manual control is controllable by authorized personnel,
wherein the adapter device receives the at least one control signal from the manual control or the at least one operating unit, adapts the at least one control signal, and forwards at least one adapted control signal to the control unit.

16. The electric motor drive according to claim 1, wherein the at least one operating unit is a device with Bluetooth function.

* * * * *